(12) United States Patent
Zoltek

(10) Patent No.: US 11,788,319 B2
(45) Date of Patent: Oct. 17, 2023

(54) TARPAULIN CLAMP

(71) Applicant: Richard Joseph Zoltek, Orangeville (CA)

(72) Inventor: Richard Joseph Zoltek, Orangeville (CA)

( * ) Notice: Subject to any disclaimer, the term of this patent is extended or adjusted under 35 U.S.C. 154(b) by 1020 days.

(21) Appl. No.: 16/368,125

(22) Filed: Mar. 28, 2019

(65) Prior Publication Data
US 2020/0308866 A1 Oct. 1, 2020

(51) Int. Cl.
*F16B 2/22* (2006.01)
*E04H 15/64* (2006.01)

(52) U.S. Cl.
CPC .............. *E04H 15/64* (2013.01); *F16B 2/22* (2013.01)

(58) Field of Classification Search
CPC .......... E04H 15/64; F16B 2/22; F16B 5/0692; Y10S 242/919; Y10T 24/4406; Y10T 24/44043
USPC ........................................................... 24/162
See application file for complete search history.

(56) References Cited

U.S. PATENT DOCUMENTS

| | | | | |
|---|---|---|---|---|
| 3,805,873 A | * | 4/1974 | Bloomfield | B44C 7/022 160/395 |
| 3,893,212 A | * | 7/1975 | Curry | F16B 5/0692 24/462 |
| 3,982,306 A | * | 9/1976 | Curry | B42F 15/066 24/462 |
| 3,987,835 A | * | 10/1976 | Bloomfield | A44B 19/20 160/403 |
| 3,999,258 A | * | 12/1976 | Curry | A44B 99/00 24/462 |
| 4,799,299 A | * | 1/1989 | Campbell | E04H 15/646 160/395 |
| 5,692,272 A | * | 12/1997 | Woods | E04H 15/64 24/115 M |
| 2017/0261018 A1 | * | 9/2017 | Gibb | G09F 7/18 |

* cited by examiner

*Primary Examiner* — Robert Sandy
(74) *Attorney, Agent, or Firm* — Aird & McBurney LP

(57) ABSTRACT

An apparatus includes a tarpaulin clamp configured to contact the opposite sides of a tarpaulin. The tarpaulin clamp includes a base assembly. The tarpaulin clamp also includes an insert assembly configured to be received in the base assembly. This is done in such a way that the tarpaulin is positioned between the base assembly and the insert assembly.

20 Claims, 6 Drawing Sheets

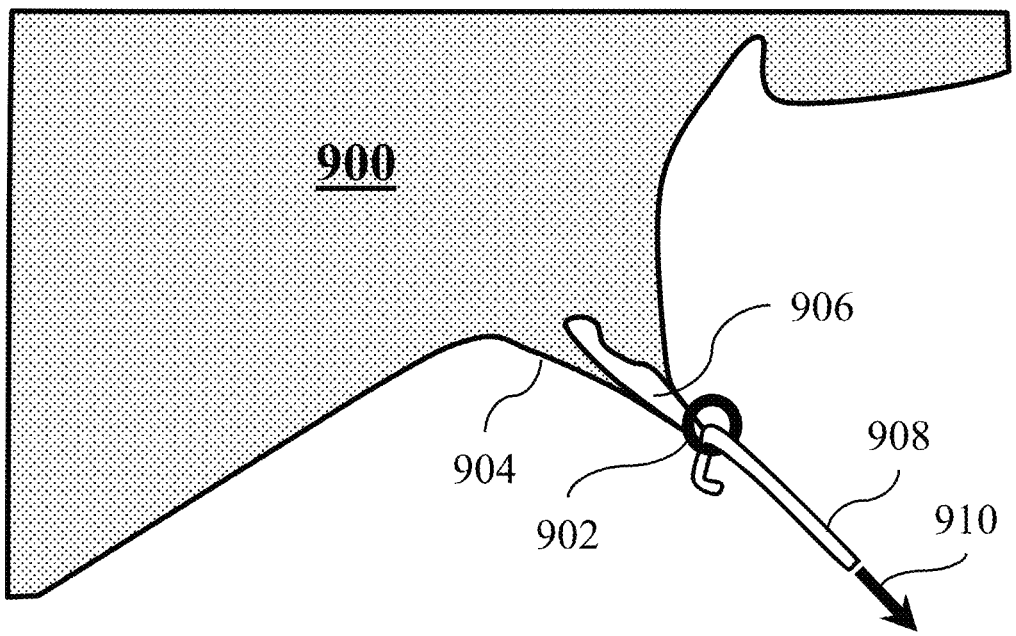
PRIOR ART  FIG. 1
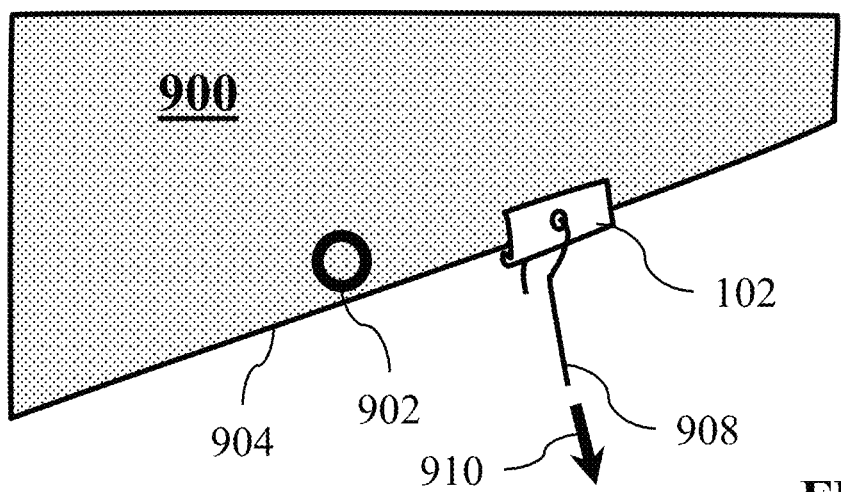
FIG. 2

TARPAULIN CLAMP

TECHNICAL FIELD

This document relates to the technical field of (and is not limited to) a tarpaulin clamp (and method therefor).

BACKGROUND

FIG. 1 depicts a perspective view of an embodiment of the PRIOR ART. A tarpaulin 900 may include a heavy-duty waterproof cloth, a web material and/or a piece of woven fabric, and may be called a tarp. The tarpaulin 900 may include a sheet of strong, flexible, water-resistant or waterproof material. The material may include a cloth material, a canvas sheet, a sheet of polyester coated with polyurethane, a plastic material (such as polyethylene), etc. The tarpaulin 900 may have at least one or more instances of a grommet 902 (a reinforced grommet). The grommets may be positioned at the corners of the tarpaulin 900, and along the sides of the tarpaulin 900. The grommet 902 may form or provide an attachment point for a connector 908 (such as, a hook, a rope, etc.), allowing the tarpaulin 900 to be tied down or suspended. The tarpaulin 900 includes an edge 904 from which the grommet 902 may be positioned proximate to the edge 904.

SUMMARY

An existing problem associated with the tarpaulin is that the tarpaulin may break (tear) due to the application of an excessive force in response to the pulling of the connector away from the grommet (while the connector remains connected to the grommet); this situation may result in a breakage 906, as shown in FIG. 1, formed in (on) the tarpaulin. The breakage may be located proximate to the grommet and/or the edge of the tarpaulin. To remedy this situation, the tarpaulin may be replaced with a new version (with added inconvenience in terms of time and/or labor for replacement, and increased cost for a new version of the tarpaulin).

It will be appreciated that there exists a need to mitigate (at least in part) at least one problem associated with the existing tarpaulin clamps (also called the existing technology) utilized with tarpaulins. After much study of the known systems and methods with experimentation, an understanding (at least in part) of the problem and its solution has been identified (at least in part) and is articulated (at least in part) as follows:

It may be desirable to provide a solution in which the occurrences of undesired breakage to the tarpaulin is reduced (at least in part) so that the tarpaulin may have a greater opportunity to withstand the application of the excessive force applied to the connector that is directed away from the grommet (while the connector remains connected to the grommet).

It may be desirable to spread the application of the excessive force over a greater surface area of the tarpaulin (versus focusing the application the excessive force to a portion (a point) on (of) the tarpaulin, such as the grommet). In this manner, the possibility of replacement of the tarpaulin may be reduced with less time and labor lost on replacement of the tarpaulin, and reduced cost of ownership of the tarpaulin.

To mitigate, at least in part, at least one problem associated with the existing technology, there is provided (in accordance with a major aspect) an apparatus. The apparatus includes and is not limited to (comprises) a tarpaulin clamp. The tarpaulin clamp is configured to contact the opposite sides of a tarpaulin. The tarpaulin clamp includes a base assembly. The tarpaulin clamp also includes an insert assembly configured to be received in the base assembly in such a way that the tarpaulin is positioned between the base assembly and the insert assembly. This arrangement results in the spreading of the application of the excessive force over a greater surface area of the tarpaulin (versus focusing the application of the excessive force to a portion (a point) on (of) the tarpaulin, such as the grommet). In this manner, the possibility of replacement of the tarpaulin may be reduced with less time and labor lost on replacement of the tarpaulin, and reduced cost of ownership of the tarpaulin.

Other aspects are identified in the claims. Other aspects and features of the non-limiting embodiments may now become apparent to those skilled in the art upon review of the following detailed description of the non-limiting embodiments with the accompanying drawings. This Summary is provided to introduce concepts in simplified form that are further described below in the Detailed Description. This Summary is not intended to identify potentially key features or possible essential features of the disclosed subject matter, and is not intended to describe each disclosed embodiment or every implementation of the disclosed subject matter. Many other novel advantages, features, and relationships will become apparent as this description proceeds. The figures (FIGS.) and the description that follow more particularly exemplify illustrative embodiments.

BRIEF DESCRIPTION OF THE DRAWINGS

The non-limiting embodiments may be more fully appreciated by reference to the following detailed description of the non-limiting embodiments when taken in conjunction with the accompanying drawings, in which:

FIG. 1 depicts a perspective view of an embodiment of the PRIOR ART; and

FIG. 2 depicts a perspective view of an embodiment of a tarpaulin clamp; and

Figure 3:
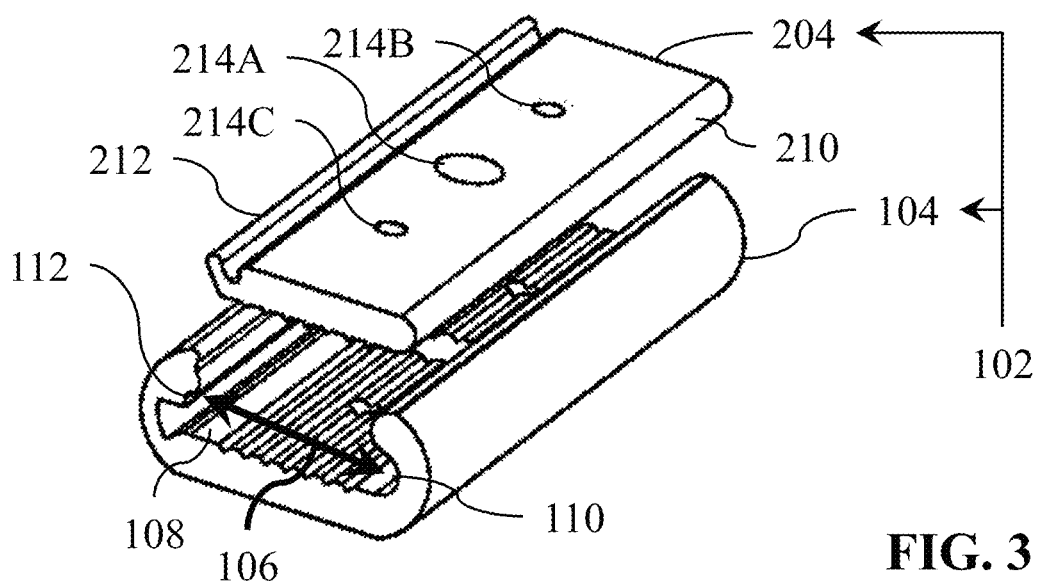
FIG. 3, FIG. 4 and FIG. 5 depict perspective views of embodiments of the tarpaulin clamp of FIG. 2.

The drawings are not necessarily to scale and may be illustrated by phantom lines, diagrammatic representations and fragmentary views. In certain instances, details unnecessary for an understanding of the embodiments (and/or details that render other details difficult to perceive) may have been omitted. Corresponding reference characters indicate corresponding components throughout the several figures of the drawings. Elements in the several figures are illustrated for simplicity and clarity and have not been drawn to scale. The dimensions of some of the elements in the figures may be emphasized relative to other elements for facilitating an understanding of the various disclosed embodiments. In addition, common, and well-understood, elements that are useful in commercially feasible embodiments are often not depicted to provide a less obstructed view of the embodiments of the present disclosure.

LISTING OF REFERENCE NUMERALS USED IN THE DRAWINGS 102 tarpaulin clamp
104 base assembly
106 base groove
108 base surface
110 first concave receiver
111 inner curved surface
112 second concave receiver
113 inner curved surface
114A, 114B, 114C base connector holes
116 gap
118 base relief pattern
119A, 119B finger structures
120 weakness zone
121 cut-out portion
204 insert assembly
208 insert surface
210 first convex edge
212 second convex edge
214A, 214B, 214C insert connector holes
218 insert relief pattern
300 translation movement direction
302 rotation movement direction
304 movement direction
306 rotational movement direction
900 tarpaulin
901 working surface
902 grommet
904 edge
908 connector
910 excessive force

DETAILED DESCRIPTION OF THE NON-LIMITING EMBODIMENT(S)

The following detailed description is merely exemplary and is not intended to limit the described embodiments or the application and uses of the described embodiments. As used, the word "exemplary" or "illustrative" means "serving as an example, instance, or illustration." Any implementation described as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure. The scope of the claim is defined by the claims (in which the claims may be amended during patent examination after the filing of this application). For the description, the terms "upper," "lower," "left," "rear," "right," "front," "vertical," "horizontal," and derivatives thereof shall relate to the examples as oriented in the drawings. There is no intention to be bound by any expressed or implied theory in the preceding Technical Field, Background, Summary or the following detailed description. It is also to be understood that the devices and processes illustrated in the attached drawings, and described in the following specification, are exemplary embodiments (examples), aspects and/or concepts defined in the appended claims. Hence, dimensions and other physical characteristics relating to the embodiments disclosed are not to be considered as limiting, unless the claims expressly state otherwise.

It is understood that the phrase "at least one" is equivalent to "a". The aspects (examples, alterations, modifications, options, variations, embodiments and any equivalent thereof) are described regarding the drawings. It should be understood that the invention is limited to the subject matter provided by the claims, and that the invention is not limited to the particular aspects depicted and described. It will be appreciated that the scope of the meaning of a device configured to be coupled to an item (that is, to be connected to, to interact with the item, etc.) is to be interpreted as the device being configured to be coupled to the item, either directly or indirectly. Therefore, "configured to" may include the meaning "either directly or indirectly" unless specifically stated otherwise.

FIG. 1 depicts a perspective view of the PRIOR ART (and is described in the Background section).

FIG. 2 depicts a perspective view of an embodiment of a tarpaulin clamp 102.

The tarpaulin clamp 102 is configured to facilitate the spreading of the application of an excessive force 910 over a greater surface area of the tarpaulin 900 (versus focusing the application of the excessive force 910 to a portion (or a point, such as the grommet 902, as depicted in FIG. 2) located on the tarpaulin 900. The tarpaulin clamp 102 is configured to reduce the possibility of replacement of the tarpaulin 900 resulting in less time and labor lost on replacement of the tarpaulin 900, along with reduced cost of ownership of the tarpaulin 900.

Figure 4:
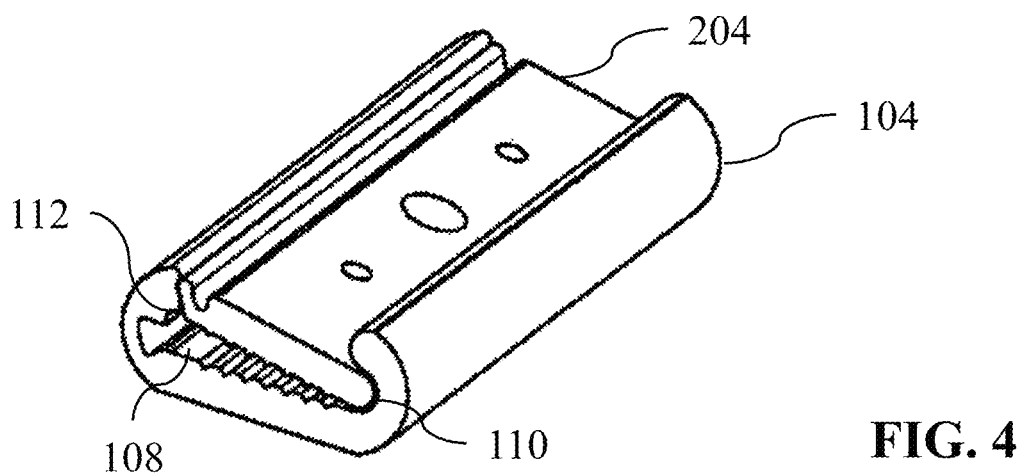
Figure 5:
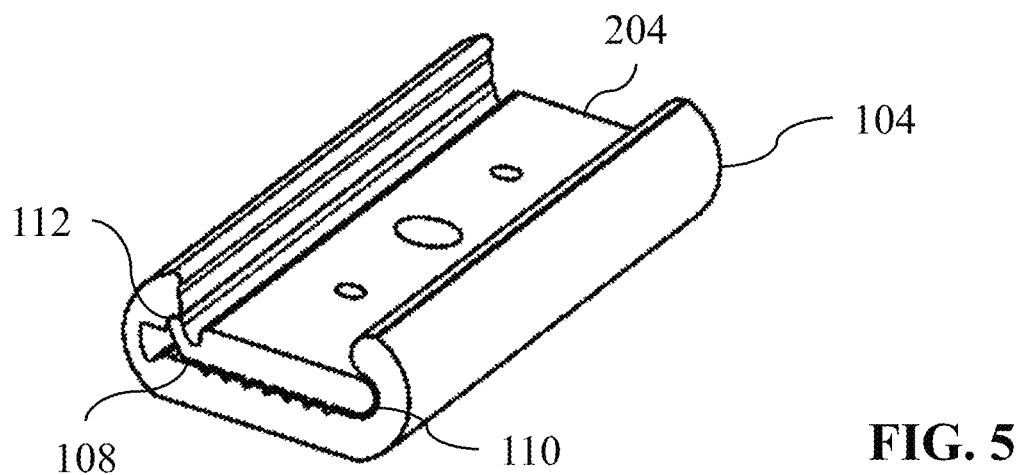

FIG. 3, FIG. 4 and FIG. 5 depict perspective views of embodiments of the tarpaulin clamp 102 of FIG. 2.

Referring to the embodiments as depicted in FIG. 3, FIG. 4 and FIG. 5, the tarpaulin clamp 102 includes a base assembly 104. The tarpaulin clamp 102 also includes an insert assembly 204. The base assembly 104 may be formed, for instance, by an injection molding process, an extrusion process or a 3D printing process, etc. The insert assembly 204 may be formed, for instance, by an injection molding process, an extrusion process or a 3D printing process, etc. The insert assembly 204 is configured to be received in the base assembly 104. The base assembly 104 defines a base groove 106. The base assembly 104 includes a base surface 108 positioned within the base groove 106. The base assembly 104 includes a first concave receiver 110 in fluid communication with the base groove 106. The base assembly 104 also includes a second concave receiver 112 in fluid communication with the base groove 106. The base surface 108 extends between the first concave receiver 110 and the second concave receiver 112. The second concave receiver 112 is spaced apart from the first concave receiver 110; this is done in such a way that the second concave receiver 112 is configured to face (faces) the first concave receiver 110.

Figure 6:
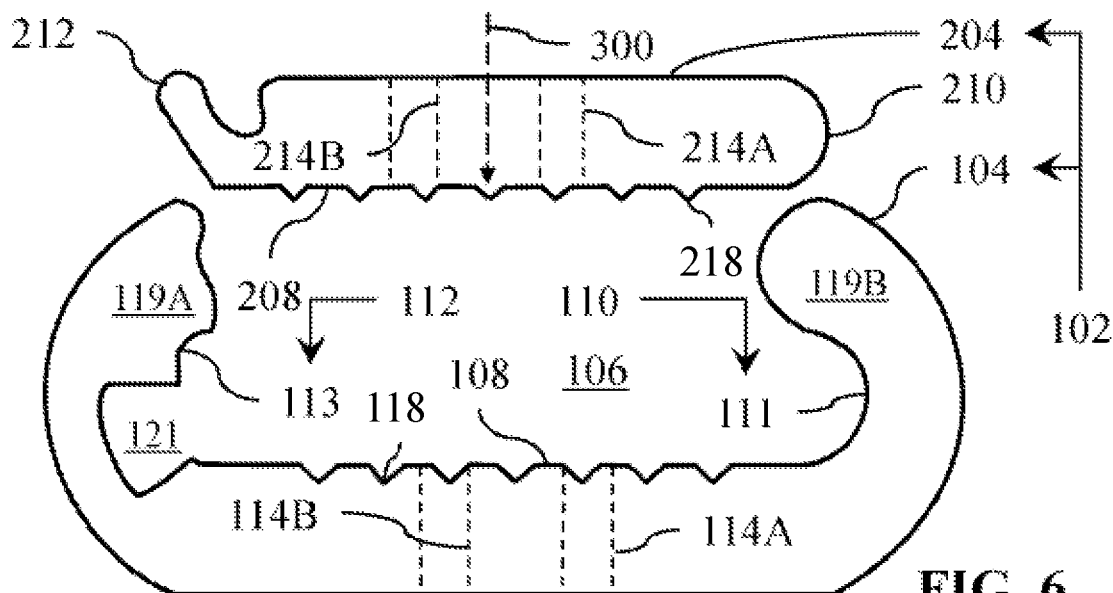
FIG. 6, FIG. 7 and FIG. 8 depict end views of embodiments of the tarpaulin clamp of FIG. 2.
Figure 14:
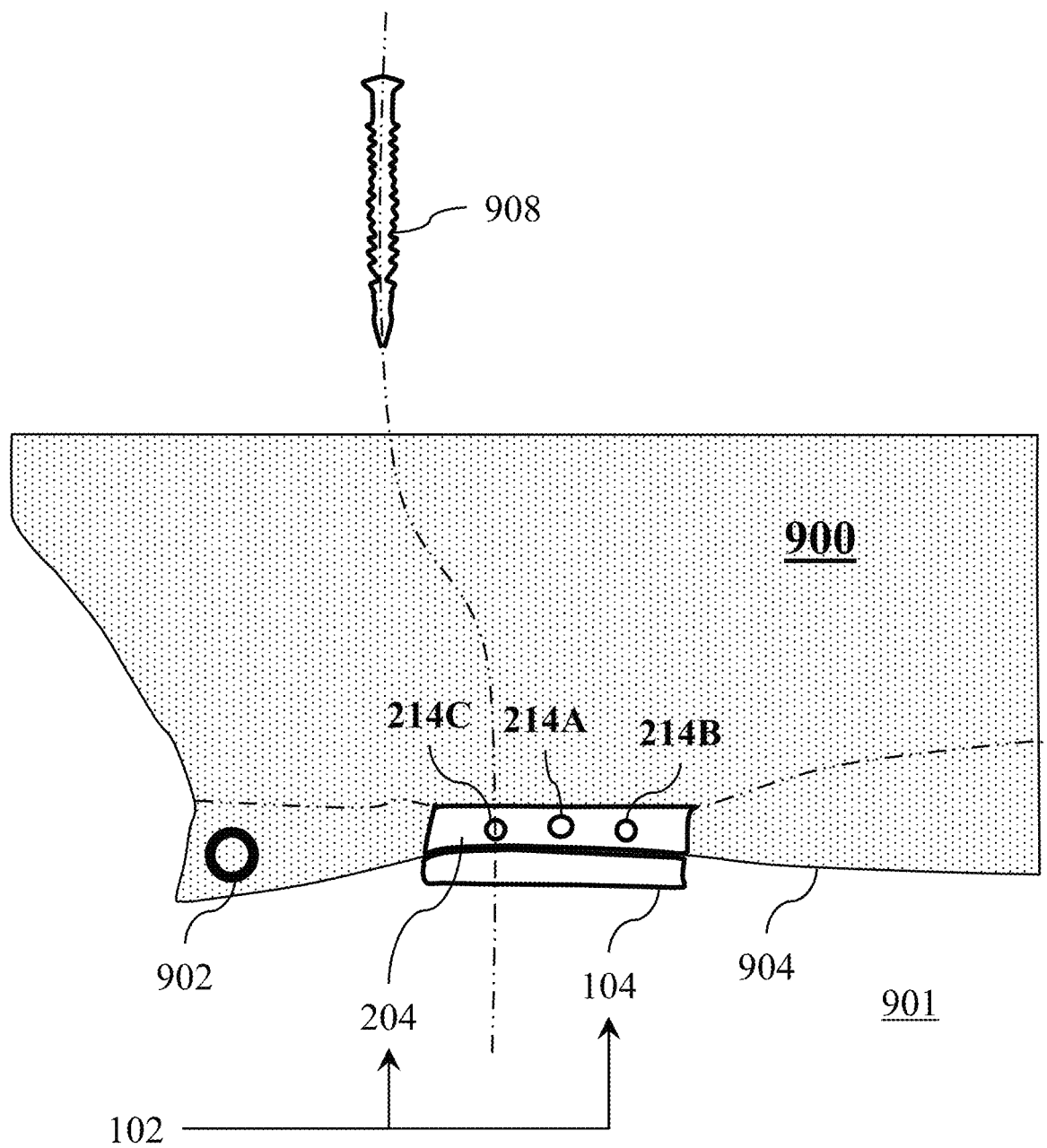
FIG. 14 depicts a perspective view of an embodiment of the tarpaulin clamp of FIG. 2.

Referring to the embodiments as depicted in FIG. 3, FIG. 4 and FIG. 5, the insert assembly 204 defines at least one or more insert connector holes (214A, 214B, 214C), such as a first insert connector hole 214A, a second insert connector hole 214B, and a third insert connector hole 214C. The insert connector holes (214A, 214B, 214C) are configured to pass through from the top surface to the bottom surface of the insert assembly 204 (as depicted in FIG. 6). The first insert connector hole 214A is configured to receive a hook device (as depicted in FIG. 2). The second insert connector hole 214B and the third insert connector hole 214C are configured to receive a connector 908 (as depicted in FIG. 14). The first insert connector hole 214A is positioned in the central zone of the insert assembly 204. The second insert connector hole 214B and the third insert connector hole 214C are positioned proximate to the respective lateral opposite outer edges of the insert assembly 204. The first insert connector hole 214A is positioned between the second insert connector hole 214B and the third insert connector hole 214C.

Figure 7:
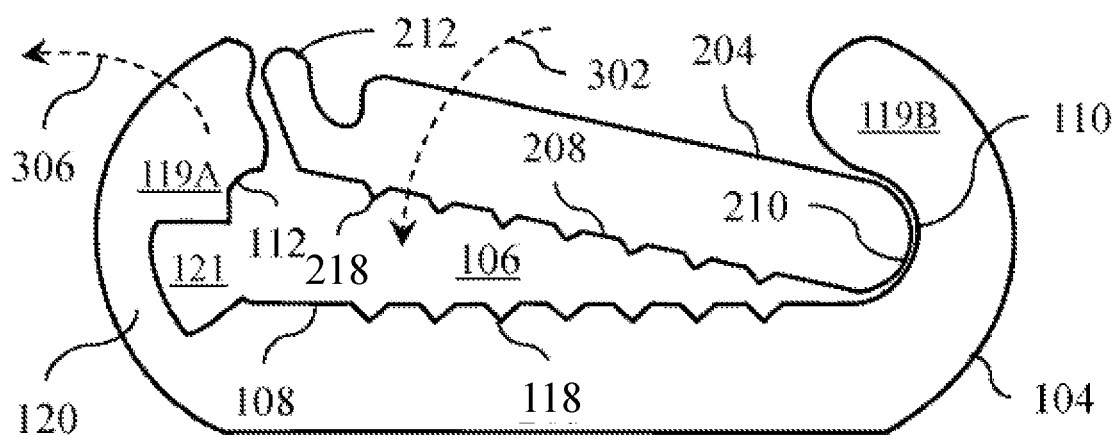
Figure 8:
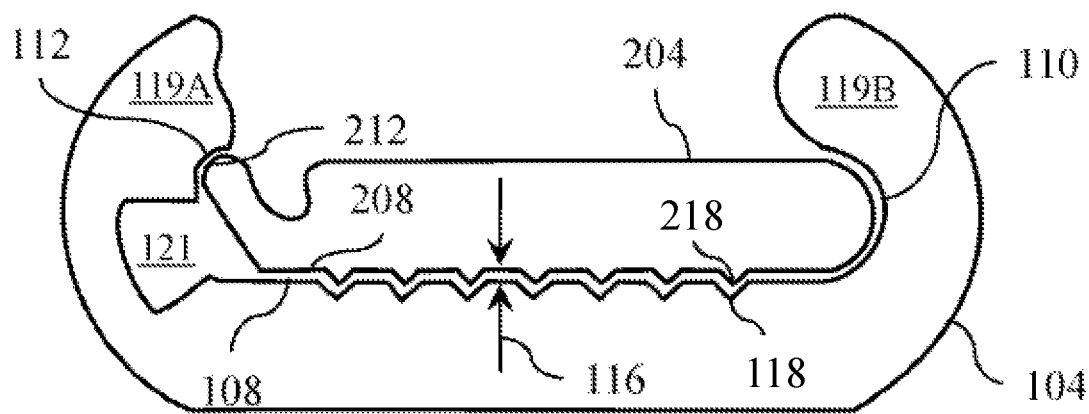

FIG. 6, FIG. 7 and FIG. 8 depict end views of embodiments of the tarpaulin clamp 102 of FIG. 2.

Referring to the embodiments as depicted in FIG. 6, FIG. 7 and FIG. 8, the insert assembly 204 includes an insert surface 208. The insert assembly 204 is configured to be received in the base groove 106 of the base assembly 104. Referring to the embodiments as depicted in FIG. 6, FIG. 7 and FIG. 8, the insert surface 208 of the insert assembly 204 is configured to be positioned proximate to the base surface 108 of the base assembly 104 in a spaced-apart relationship once the insert assembly 204 is received in the base groove 106 of the base assembly 104. The insert assembly 204 is spaced-apart from the base surface 108 of the base assembly 104 once the insert assembly 204 is received in the base groove 106 of the base assembly 104. The insert assembly 204 is maintained in a spaced-apart relationship to the base surface 108 of the base assembly 104 once the insert assembly 204 is received (and held) in the base groove 106 of the base assembly 104.

Referring to the embodiments as depicted in FIG. 6, FIG. 7 and FIG. 8, the insert surface 208 of the insert assembly 204 is configured to be positioned proximate to the base surface 108 of the base assembly 104 in a spaced-apart relationship once the insert assembly 204 is received (and held) in the base groove 106 of the base assembly 104. The insert assembly 204 is spaced-apart from the base surface 108 of the base assembly 104 once the insert assembly 204 is received (and held) in the base groove 106 of the base assembly 104.

Referring to the embodiments as depicted in FIG. 6, FIG. 7 and FIG. 8, the second concave receiver 112 is spaced apart from the first concave receiver 110; this is done in such a way that an inner curved surface 113 of the second concave receiver 112 is configured to face (faces) an inner curved surface 111 of the first concave receiver 110.

Referring to the embodiments as depicted in FIG. 6, FIG. 7 and FIG. 8, the insert assembly 204 includes a first convex edge 210 configured to be received in the first concave receiver 110 of the base assembly 104. The insert assembly 204 also includes a second convex edge 212 configured to be received in the second concave receiver 112 of the base assembly 104.

The insert surface 208 extends between the first convex edge 210 and the second convex edge 212. The first convex edge 210 and the second convex edge 212 are configured to face oppositely away from each other.

Referring to the embodiments as depicted in FIG. 6, the first insert connector hole 214A of the insert assembly 204 is configured to (is positioned to) coaxially align (one above the other) with the first base connector hole 114A (once the insert assembly 204 is inserted into and received by the base assembly 104). The second insert connector hole 214B of the insert assembly 204 is configured to (is positioned to) coaxially align (one above the other) with the second base connector hole 114B (once the insert assembly 204 is inserted into and received by the base assembly 104).

Figure 9:
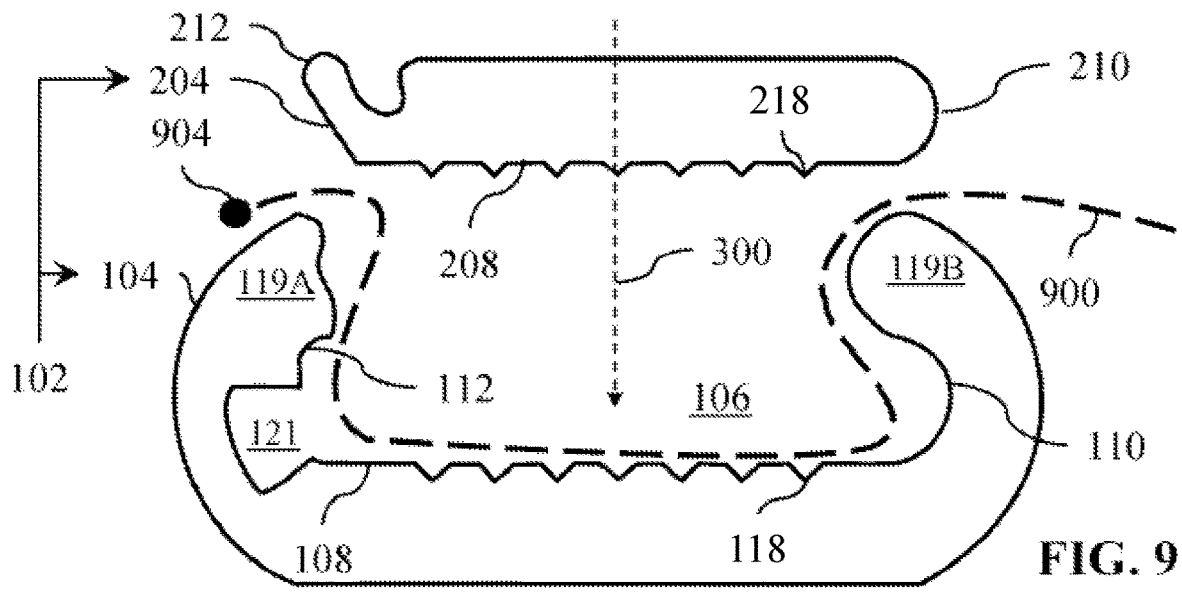
FIG. 9, FIG. 10 and FIG. 11 depict end views of embodiments of the tarpaulin clamp of FIG. 2.
Figure 10:
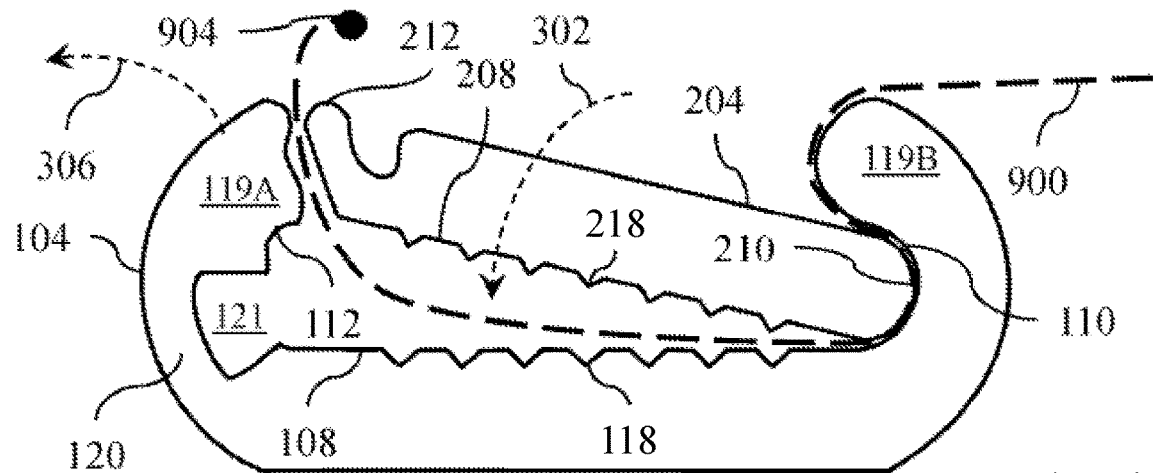
Figure 11:
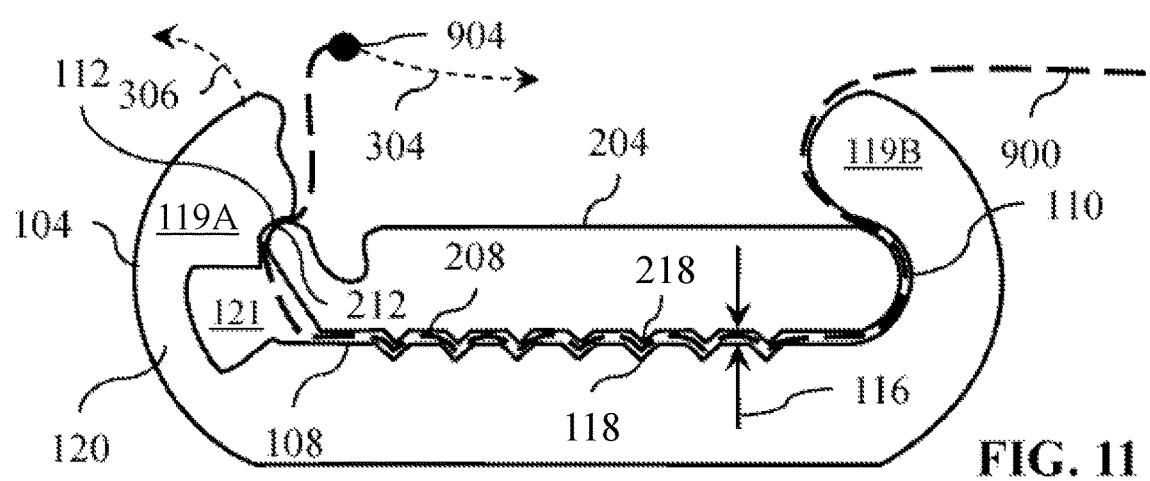

Referring to the embodiment as depicted in FIG. 6, the base assembly 104 includes a pair of opposed extending finger structures (119A, 119B). The combination of the base surface 108 and the opposed extending finger structures (119A, 119B) are configured to (include) a U-shaped structure. The opposed extending finger structures (119A, 119B) extend upwardly from the base surface 108, with the base surface 108 extending between the opposed extending finger structures (119A, 119B). At least one of the opposed extending finger structures (119A, 119B) is configured to be resiliently deformable in response to movement of the insert assembly 204 along a translation movement direction 300 toward the base surface 108 of the base assembly 104 (as depicted in FIG. 7). The insert assembly 204 is manually movable by a user. At least one of the opposed extending finger structures (119A, 119B) is configured to resiliently deform to permit movement of the insert assembly 204 into the base groove 106 so that the insert surface 208 of the insert assembly 204 may be positioned proximate to (adjacent to) the base surface 108 of the base assembly 104. A gap 116 is formed between the insert surface 208 of the insert assembly 204 and the base surface 108 of the base assembly 104 once the insert surface 208 of the insert assembly 204 is positioned proximate to the base surface 108 of the base assembly 104. The tarpaulin 900 is configured to be positioned in the gap 116 (as depicted in FIG. 9, FIG. 10 and FIG. 11).

Referring to the embodiments as depicted in FIG. 7 and FIG. 8, the base assembly 104 includes a cut-out portion 121 (that is located or positioned proximate to the second concave receiver 112), and also includes a weakness zone 120. The cut-out portion 121 is positioned proximate to the weakness zone 120. The weakness zone 120 is configured to permit flexible movement of at least one opposed extending finger structure (119A). The first convex edge 210 of the insert assembly 204 is moved proximate to (moved into close position against) the first concave receiver 110 of the base assembly 104. The insert assembly 204 is permitted to rotate (by the user) along a rotation movement direction 302. The second convex edge 212 of the insert assembly 204 is moved proximate to (moved into close position against) the second concave receiver 112 of the base assembly 104. The user pulls at least one opposed extending finger structure (119A) along the rotational movement direction 306 since the weakness zone 120 permits flexible movement of at least one opposed extending finger structure (119A). Then, the user may move the insert assembly 204 along the rotation movement direction 302 (as depicted in FIG. 7) so that the second concave receiver 112 and the second convex edge 212 may be positioned proximate to each other (as depicted in FIG. 8), and the insert surface 208 and the base surface 108 may be positioned proximate to each other (in a parallel alignment) with the gap 116 formed therebetween (as depicted in FIG. 8).

Referring to the embodiments as depicted in FIG. 6, FIG. 7 and FIG. 8, the base assembly 104 forms (includes) a base relief pattern 118. The insert assembly 204 forms (includes) an insert relief pattern 218. The base relief pattern 118 and the insert relief pattern 218 are configured to have complementary conformal surfaces. The base relief pattern 118 and the insert relief pattern 218 are configured to improve the grip of the base assembly 104 and the insert assembly 204 with the tarpaulin 900 (as depicted in FIG. 11). For instance, the base relief pattern 118 may include at least one or more protrusions or a set of protrusions, and the insert relief pattern 218 may include at least one or more indentations or a set of indentations. In accordance with an optional embodiment, the base assembly 104 forms (includes) the base relief pattern 118 (such as a protrusion or set of protrusions, etc.), and the insert assembly 204 forms (includes) a flat surface with no complementary conformal surface corresponding to the base relief pattern 118. For instance, the base relief pattern 118 may include a protrusion or set of protrusions, and the insert relief pattern 218 may include a flat surface.

Referring to the embodiments as depicted in FIG. 6, FIG. 7 and FIG. 8, the base assembly 104 includes a base relief pattern 118. The base relief pattern 118 is configured to improve the grip of the base assembly 104 and the insert assembly 204 with the tarpaulin 900.

Referring to the embodiments as depicted in FIG. 6, FIG. 7 and FIG. 8, the insert assembly 204 includes an insert relief pattern 218. The insert relief pattern 218 is configured to improve the grip of the base assembly 104 and the insert assembly 204 with the tarpaulin 900..

FIG. 9, FIG. 10 and FIG. 11 depict end views of embodiments of the tarpaulin clamp 102 of FIG. 2.

Referring to the embodiments as depicted in FIG. 9, FIG. 10 and FIG. 11, the tarpaulin clamp 102 is configured to contact the opposite sides of a tarpaulin 900 (as depicted in FIG. 2, FIG. 9, FIG. 10, FIG. 11 and FIG. 14). The tarpaulin clamp 102 includes a base assembly 104. The tarpaulin clamp 102 also includes an insert assembly 204. The insert assembly 204 is configured to be received in the base assembly 104; this is done in such a way that the tarpaulin 900 is positioned between the base assembly 104 and the insert assembly 204 (as depicted in FIG. 9, FIG. 10 and FIG. 11).

Referring to the embodiments as depicted in FIG. 9, FIG. 10 and FIG. 11, the base assembly 104 and the insert assembly 204 are configured to be positioned on the opposite sides of the tarpaulin 900 (as depicted in FIG. 9, FIG. 10 and FIG. 11). The base assembly 104 and the insert assembly 204 are configured to contact the opposite sides of the tarpaulin 900 once the insert assembly 204 is received in the base assembly 104 with the tarpaulin 900 positioned between the base assembly 104 and the insert assembly 204 (as depicted in FIG. 9, FIG. 10 and FIG. 11).

Referring to the embodiments as depicted in FIG. 9, FIG. 10 and FIG. 11, the base assembly 104 defines a base groove 106. The base assembly 104 includes a base surface 108 positioned within the base groove 106. The base assembly 104 and the insert assembly 204 are configured to contact the opposite sides of the tarpaulin 900 once the insert assembly 204 is received in the base groove 106 of the base assembly 104 with the tarpaulin 900 positioned between the base assembly 104 and the insert assembly 204 (as depicted in FIG. 9, FIG. 10 and FIG. 11).

Referring to the embodiments as depicted in FIG. 9, FIG. 10 and FIG. 11, the base assembly 104 and the insert assembly 204 are configured to contact the opposite sides of the tarpaulin 900 once the insert assembly 204 is received in the base groove 106 of the base assembly 104 with the tarpaulin 900 positioned between the base assembly 104 and the insert assembly 204 (as depicted in FIG. 9, FIG. 10 and FIG. 11).

Referring to the embodiments as depicted in FIG. 9, FIG. 10 and FIG. 11, the tarpaulin 900 includes an edge 904. The tarpaulin 900 is inserted (by the user) into the base groove 106 of the base assembly 104, and a part of the tarpaulin 900 is positioned against the base surface 108 of the base assembly 104. The edge 904 is positioned proximate to at least one opposed extending finger structure (119A).

Referring to the embodiment as depicted in FIG. 9, the insert assembly 204 is moved along the translation movement direction 300 (the insert assembly 204 is moved by the user) until the first concave receiver 110 and the first convex edge 210 are positioned proximate to each other.

Referring to the embodiment as depicted in FIG. 10, the insert assembly 204 is moved along the rotation movement direction 302 (the insert assembly 204 is moved by the user) until the second concave receiver 112 and the second convex edge 212 are positioned proximate to each other. The user grabs (manipulates) at least one opposed extending finger structure (119A) and then the user moves (rotates or deflects) at least one opposed extending finger structure (119A) along the rotational movement direction 306. In response, the weakness zone 120 permits the at least one opposed extending finger structure (119A) to deflect outwardly just enough to permit the rotational movement of the insert assembly 204 along the rotation movement direction 302.

Referring to the embodiment as depicted in FIG. 11, the gap 116 is formed between the insert surface 208 and the base surface 108 once the second concave receiver 112 and the second convex edge 212 are positioned proximate to each other.

Referring to the embodiment as depicted in FIG. 11, at least one opposed extending finger structure (119A) is moved along the rotational movement direction 306 so that the insert assembly 204 may be removed from the base groove 106 of the base assembly 104. Then the edge 904 is moved (by the user) along the movement direction 304 to remove the tarpaulin 900 from the base assembly 104.

Figure 12:
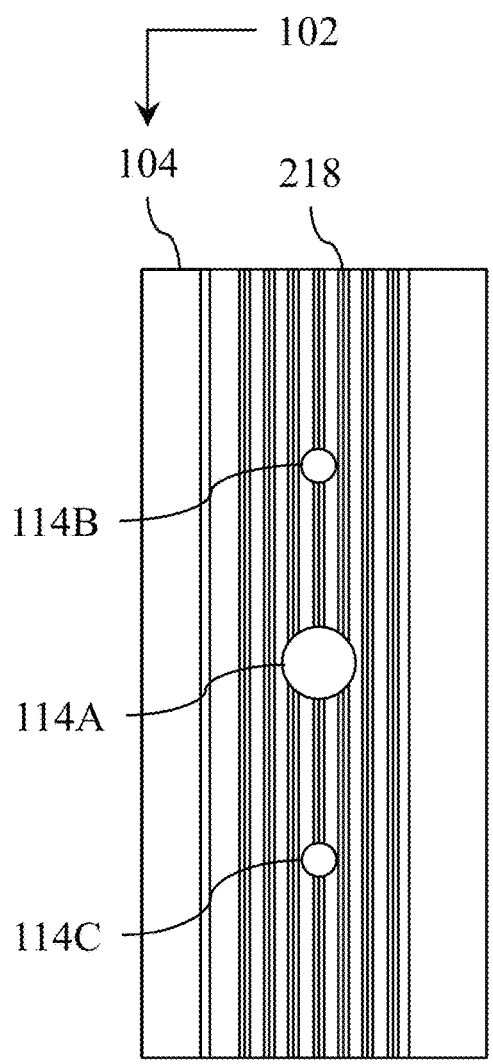
FIG. 12 and FIG. 13 depict top views of embodiments of the tarpaulin clamp of FIG. 2.
Figure 13:
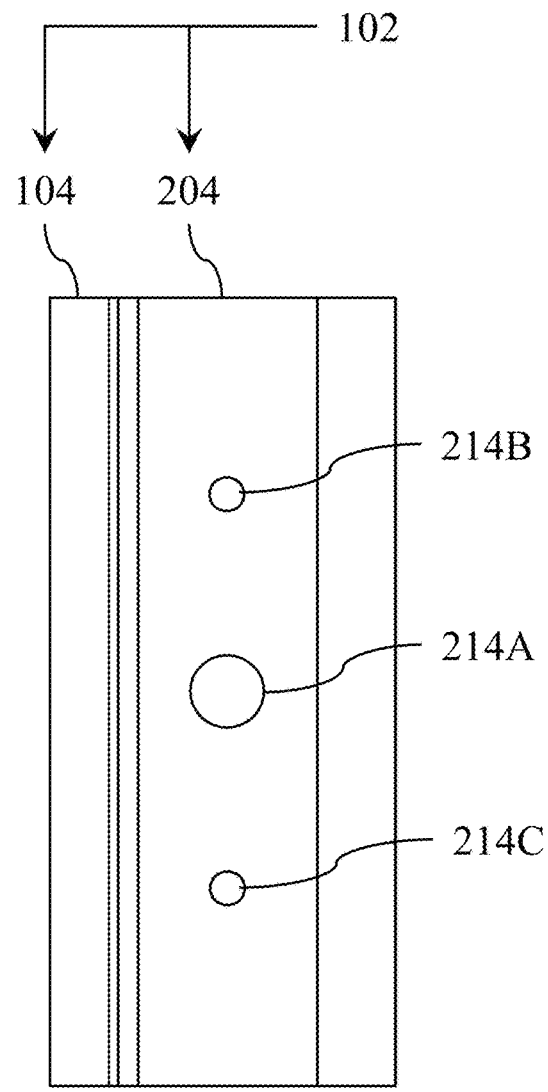

FIG. 12 and FIG. 13 depict top views of embodiments of the tarpaulin clamp 102 of FIG. 2.

Referring to the embodiment as depicted in FIG. 12, the base assembly 104 defines at least one or more base connector holes (114A, 114B, 114C), such as a first base connector hole 114A, a second base connector hole 114B, and a third base connector hole 114C. The base connector holes (114A, 114B, 114C) are configured to pass through from the top surface to the bottom surface of the base assembly 104 (as depicted in FIG. 6). The first base connector hole 114A is configured to receive a hook device (as depicted in FIG. 2). The second base connector hole 114B and the third base connector hole 114C are configured to receive a connector 908 (as depicted in FIG. 14). The first base connector hole 114A is positioned in the central zone of the base assembly 104. The second base connector hole 114B and the third base connector hole 114C are positioned proximate to the respective lateral opposite outer edges of the base assembly 104. The first base connector hole 114A is positioned between the second base connector hole 114B and the third base connector hole 114C.

Referring to the embodiment as depicted in FIG. 12, the insert assembly 204 defines at least one or more insert connector holes (214A, 214B, 214C). At least one or more insert connector holes (214A, 214B, 214C) are configured to pass through the insert assembly 204. The base assembly 104 defines at least one or more base connector holes (114A, 114B, 114C). At least one or more base connector holes (114A, 114B, 114C) are configured to pass through the base assembly 104. At least one or more insert connector holes (214A, 214B, 214C) and at least one or more base connector holes (114A, 114B, 114C) are alignable with each other once the insert assembly 204 is inserted into the base assembly 104.

Referring to the embodiment as depicted in FIG. 13, at least one or more insert connector holes (214A, 214B, 214C) of the insert assembly 204 are configured to coaxially align (one above the other) with a respective instance of at least one or more base connector holes (114A, 114B, 114C), as depicted in FIG. 12 (once the insert assembly 204 is inserted into and received by the base assembly 104).

FIG. 14 depicts a perspective view of an embodiment of the tarpaulin clamp 102 of FIG. 2.

Referring to the embodiment as depicted in FIG. 14, the connector 908 is depicted (such as a screw, etc.). The tarpaulin 900 is sandwiched between the base assembly 104 and the insert assembly 204. The first insert connector hole 214A of the insert assembly 204 is not utilized (for receiving a hook, etc.). The second insert connector hole 214B of the insert assembly 204 and the aligned second base connector hole 114B receive the connector 908. The third insert connector hole 214C of the insert assembly 204 receives another connector (if so desired). In this manner, the base assembly 104 and the insert assembly 204, along with the tarpaulin 900, may be connected securely to a working surface 901.

The following is offered as further description of the embodiments, in which any one or more of any technical feature (described in the detailed description, the summary and the claims) may be combinable with any other one or more of any technical feature (described in the detailed description, the summary and the claims). It is understood that each claim in the claims section is an open ended claim unless stated otherwise. Unless otherwise specified, relational terms used in these specifications should be construed to include certain tolerances that the person skilled in the art would recognize as providing equivalent functionality. By way of example, the term perpendicular is not necessarily limited to 90.0 degrees, and may include a variation thereof that the person skilled in the art would recognize as providing equivalent functionality for the purposes described for the relevant member or element. Terms such as "about" and "substantially", in the context of configuration, relate generally to disposition, location, or configuration that are either exact or sufficiently close to the location, disposition, or configuration of the relevant element to preserve operability of the element within the invention which does not materially modify the invention. Similarly, unless specifically made clear from its context, numerical values should be construed to include certain tolerances that the person skilled in the art would recognize as having negligible importance as they do not materially change the operability of the invention. It will be appreciated that the description and/or drawings identify and describe embodiments of the apparatus (either explicitly or inherently). The apparatus may include any suitable combination and/or permutation of the technical features as identified in the detailed description, as may be required and/or desired to suit a particular technical purpose and/or technical function. It will be appreciated that, where possible and suitable, any one or more of the technical features of the apparatus may be combined with any other one or more of the technical features of the apparatus (in any combination and/or permutation). It will be appreciated that persons skilled in the art would know that the technical features of each embodiment may be deployed (where possible) in other embodiments even if not expressly stated as such above. It will be appreciated that persons skilled in the art would know that other options would be possible for the configuration of the components of the apparatus to adjust to manufacturing requirements and still remain within the scope as described in at least one or more of the claims. This written description provides embodiments, including the best mode, and also enables the person skilled in the art to make and use the embodiments. The patentable scope may be defined by the claims. The written description and/or drawings may help to understand the scope of the claims. It is believed that all the crucial aspects of the disclosed subject matter have been provided in this document. It is understood, for this document, that the word "includes" is equivalent to the word "comprising" in that both words are used to signify an open-ended listing of assemblies, components, parts, etc. The term "comprising", which is synonymous with the terms "including," "containing," or "characterized by," is inclusive or open-ended and does not exclude additional, unrecited elements or method steps. Comprising (comprised of) is an "open" phrase and allows coverage of technologies that employ additional, unrecited elements. When used in a claim, the word "comprising" is the transitory verb (transitional term) that separates the preamble of the claim from the technical features of the invention. The foregoing has outlined the non-limiting embodiments (examples). The description is made for particular non-limiting embodiments (examples). It is understood that the non-limiting embodiments are merely illustrative as examples.

What is claimed is:

1. A tarpaulin clamp configured to contact opposite sides of a tarpaulin, the tarpaulin clamp comprising:
   a base assembly that defines at least one base connector hole configured to pass through the base assembly, wherein the base assembly includes a base surface and opposed extending finger structures extending upwardly from the base surface, with the base surface extending between said opposed extending finger structures, and wherein a combination of the base surface and the opposed extending finger structures are configured to form a U-shaped structure; and
   an insert assembly that defines at least one insert connector hole configured to pass through the insert assembly;
   wherein the insert assembly is configured to be received in the base assembly with the tarpaulin positioned between the base assembly and the insert assembly, with the base assembly and the insert assembly in contact with the opposite sides of the tarpaulin, and with the at least one base connector hole and the at least one insert connector hole positioned on the opposite sides of the tarpaulin; and
   wherein once the insert assembly is received in the base assembly, each one of the at least one base connector hole is coaxially aligned with a respective one of the at least one insert connector hole.

2. The tarpaulin clamp of claim 1, wherein:
   the base assembly defines a base groove;
   the base surface is positioned within the base groove;
   the base assembly and the insert assembly are configured to contact the opposite sides of the tarpaulin once the insert assembly is received in the base groove of the base assembly with the tarpaulin positioned between the base assembly and the insert assembly;
   the insert assembly includes an insert surface;
   the inset assembly is configured to be received in the base groove of the base assembly; and
   the insert surface of the insert assembly is configured to be positioned proximate to the base surface of the base assembly in a spaced-apart relationship to the base surface of the base assembly once the insert assembly is received in the base groove of the base assembly.

3. The tarpaulin clamp of claim 1, wherein:
   the base assembly defines a base groove;
   the base surface is positioned within the base groove;
   the base assembly and the insert assembly are configured to contact the opposite sides of the tarpaulin once the insert assembly is received in the base groove of the base assembly with the tarpaulin positioned between the base assembly and the insert assembly;
   the base assembly includes a first concave receiver being in fluid communication with the base groove; and
   the base assembly also includes a second concave receiver being in fluid communication with the base groove.

4. The tarpaulin clamp of claim 3, wherein:
the base surface extends between the first concave receiver and the second concave receiver; and
the second concave receiver is spaced apart from the first concave receiver in such a way that the second concave receiver is configured to face the first concave receiver.

5. The tarpaulin clamp of claim 4, wherein:
the second concave receiver is spaced apart from the first concave receiver in such a way that an inner curved surface of the second concave receiver is configured to face an inner curved surface of the first concave receiver.

6. The tarpaulin clamp of claim 5, wherein:
the insert assembly includes an insert surface; and
the insert assembly includes a first convex edge configured to be received in the first concave receiver of the base assembly; and
the insert assembly also includes a second convex edge configured to be received in the second concave receiver of the base assembly; and
the insert surface extends between the first convex edge and the second convex edge.

7. The tarpaulin clamp of claim 6, wherein:
the first convex edge and the second convex edge are configured to face oppositely away from each other.

8. The tarpaulin clamp of claim 1, wherein:
at least one of said opposed extending finger structures is configured to be resiliently deformable in response to movement of the insert assembly along a translation movement direction toward the base surface of the base assembly.

9. The tarpaulin clamp of claim 1, wherein:
at least one of said opposed extending finger structures is configured to resiliently deform to permit movement of the insert assembly into a base groove defined by the base assembly so that an insert surface of the insert assembly is proximate to, and adjacent to, the base surface of the base assembly so that a gap is formed between the insert surface of the insert assembly and the base surface of the base assembly once the insert surface of the insert assembly is positioned proximate to the base surface of the base assembly.

10. The tarpaulin clamp of claim 1, wherein:
the base assembly includes a cut-out portion; and
the base assembly also includes a weakness zone, and the cut-out portion is positioned proximate to the weakness zone; and
the weakness zone is configured to permit flexible movement of at least one of said opposed extending finger structures.

11. The tarpaulin clamp of claim 1, wherein:
the base assembly includes a base relief pattern that includes at least one or more protrusions; and
the insert assembly includes an insert relief pattern that includes at least one or more indentations; and
the base relief pattern and the insert relief pattern are configured to have complementary conformal surfaces; and
the base relief pattern and the insert relief pattern are configured to improve a grip of the base assembly and the insert assembly with the tarpaulin.

12. A tarpaulin clamp configured to contact opposite sides of a tarpaulin, the tarpaulin clamp comprising:
a base assembly that defines a plurality of base connector holes, wherein each of the plurality of base connector holes is configured to pass through the base assembly; and
an insert assembly configured to be received in the base assembly and that defines a plurality of insert connector holes, wherein each of the plurality of insert connector holes is configured to pass through the insert assembly;
wherein the insert assembly is configured to be received in the base assembly with the tarpaulin positioned between the base assembly and the insert assembly, with the base assembly and the insert assembly in contact with the opposite sides of the tarpaulin, and with the plurality of base connector holes and the plurality of insert connector holes positioned on the opposite sides of the tarpaulin; and
wherein once the insert assembly is received in the base assembly, each one of the plurality of base connector holes is coaxially aligned with a respective one of the plurality of insert connector holes.

13. The tarpaulin clamp of claim 12, wherein:
the plurality of base connector holes comprises a first base connector hole, a second base connector hole and a third base connector hole, wherein the first base connector hole is positioned between the second base connector hole and the third base connector hole; and
the plurality of insert connector holes comprises a first insert connector hole, a second insert connector hole and a third insert connector hole, wherein the first insert connector hole is positioned between the second insert connector hole and the third insert connector hole
wherein once the insert assembly is received in the base assembly: the first base connector hole is coaxially aligned with the first insert connector hole; the second base connector hole is coaxially aligned with the second insert connector hole; and the third base connector hole is coaxially aligned with the third insert connector hole.

14. The tarpaulin clamp of claim 12, wherein:
the base assembly defines a base groove;
the base assembly includes a base surface positioned within the base groove;
the base assembly and the insert assembly are configured to contact the opposite sides of the tarpaulin once the insert assembly is received in the base groove of the base assembly with the tarpaulin positioned between the base assembly and the insert assembly;
the insert assembly includes an insert surface;
the insert assembly is configured to be received in the base groove of the base assembly; and
the insert surface of the insert assembly is configured to be positioned proximate to the base surface of the base assembly in a spaced-apart relationship to the base surface of the base assembly once the insert assembly is received in the base groove of the base assembly.

15. The tarpaulin clamp of claim 12, wherein:
the base assembly defines a base groove;
the base assembly includes a base surface positioned within the base groove;
the base assembly and the insert assembly are configured to contact the opposite sides of the tarpaulin once the insert assembly is received in the base groove of the base assembly with the tarpaulin positioned between the base assembly and the insert assembly;
the base assembly includes a first concave receiver being in fluid communication with the base groove; and
the base assembly also includes a second concave receiver being in fluid communication with the base groove.

16. The tarpaulin clamp of claim 15, wherein:
the base surface extends between the first concave receiver and the second concave receiver; and the second concave receiver is spaced apart from the first concave receiver in such a way that the second concave receiver is configured to face the first concave receiver.

17. The tarpaulin clamp of claim 16, wherein:
the second concave receiver is spaced apart from the first concave receiver in such a way that an inner curved surface of the second concave receiver is configured to face an inner curved surface of the first concave receiver.

18. The tarpaulin clamp of claim 17, wherein:
the insert assembly includes an insert surface; and
the insert assembly includes a first convex edge configured to be received in the first concave receiver of the base assembly; and
the insert assembly also includes a second convex edge configured to be received in the second concave receiver of the base assembly; and
the insert surface extends between the first convex edge and the second convex edge.

19. The tarpaulin clamp of claim 12, wherein:
the base assembly includes a base relief pattern that includes at least one or more protrusions; and
the insert assembly includes an insert relief pattern that includes at least one or more indentations; and
the base relief pattern and the insert relief pattern are configured to have complementary conformal surfaces; and
the base relief pattern and the insert relief pattern are configured to improve a grip of the base assembly and the insert assembly with the tarpaulin.

20. A system for securing a tarpaulin, the system comprising:
a tarpaulin clamp configured to contact opposite sides of the tarpaulin, the tarpaulin clamp comprising:
a base assembly that defines at least one base connector hole configured to pass through the base assembly; and
an insert assembly that defines at least one insert connector hole configured to pass through the insert assembly;
wherein the insert assembly is configured to be received in the base assembly with the tarpaulin positioned between the base assembly and the insert assembly, with the base assembly and the insert assembly are in contact with the opposite sides of the tarpaulin, and with the at least one base connector hole and the at least one insert connector hole positioned on the opposite sides of the tarpaulin; and
wherein once the insert assembly is received in the base assembly, each one of the at least one base connector hole is coaxially aligned with a respective one of the at least one insert connector hole; and
a connector configured to be received through one of the at least one base connector hole and the respective one of the at least one insert connector hole that is aligned with the one of the at least one base connector hole, once the insert assembly is received in the base groove of the base assembly with the tarpaulin positioned between the base assembly and the insert assembly.

* * * * *